US 8,424,085 B2

(12) United States Patent
Olfat et al.

(10) Patent No.: US 8,424,085 B2
(45) Date of Patent: Apr. 16, 2013

(54) DETECTING A DENIAL OF SERVICE ATTACK

(75) Inventors: Masoud Olfat, Great Falls, VA (US); Sungki Park, Ashburn, VA (US); Dhaval Dipak Mehta, Herndon, VA (US)

(73) Assignee: Clearwire IP Holdings LLC, Bellevue, WA (US)

( * ) Notice: Subject to any disclaimer, the term of this patent is extended or adjusted under 35 U.S.C. 154(b) by 663 days.

(21) Appl. No.: 12/500,656

(22) Filed: Jul. 10, 2009

(65) Prior Publication Data

US 2011/0010771 A1 Jan. 13, 2011

(51) Int. Cl.
*G06F 21/06* (2006.01)
(52) U.S. Cl.
USPC .................................. 726/22; 726/23
(58) Field of Classification Search ............. 726/9, 26, 726/27, 28, 29, 22; 713/224, 201, 212, 218, 713/220, 223; 709/204, 201, 220, 227; 380/200, 380/201, 202, 203, 277
See application file for complete search history.

(56) References Cited

U.S. PATENT DOCUMENTS

| | | |
|---|---|---|
| 2005/0250499 A1 | 11/2005 | Lee et al. |
| 2006/0099972 A1 | 5/2006 | Nair et al. |
| 2006/0234742 A1* | 10/2006 | Kim et al. ............... 455/513 |
| 2007/0078999 A1 | 4/2007 | Corson et al. |
| 2007/0083669 A1 | 4/2007 | Tsirtsis et al. |
| 2007/0270147 A1 | 11/2007 | Choi et al. |
| 2007/0298761 A1 | 12/2007 | Bani Hani |
| 2009/0131056 A1 | 5/2009 | Bontu et al. |
| 2010/0144349 A1 | 6/2010 | Kang et al. |

OTHER PUBLICATIONS

Unknown Author, IEEE WirelessMAN P802.16e/D7 draft 7 for Local and metropolitan area networks, Apr. 7, 2005, All Pages.*
Author Unknown, IEEE 802.16e Standard, draft 7, Apr. 7, 2005, pp. 1-5, 81-170 and 516-518.
V. Yanover, B. Kim, I. Shahar Y. Eliaspur, H. Lim, Network Re-Entry Optimization, May 4, 2005, pp. 1-5.

* cited by examiner

*Primary Examiner* — Jeffrey Pwu
*Assistant Examiner* — Nega Woldemariam
(74) *Attorney, Agent, or Firm* — O'Brien Jones, PLLC (57) ABSTRACT

A plurality of ranging processes are performed to monitor a status of a wireless link associated with a device identifier. A ranging request that includes the device identifier and a message skip indicator is received. It is determined that the device identifier is already associated with the wireless link. A duration since a previously completed ranging process is determined. Based on the duration, and the message skip indicator, it is determined whether to respond to the ranging request.

19 Claims, 9 Drawing Sheets

DETECTING A DENIAL OF SERVICE ATTACK

TECHNICAL BACKGROUND

Wireless communication may be used as a means of accessing a network. Wireless communication has certain advantages over wired communications for accessing a network. One of those advantages is a lower cost of infrastructure to provide access to many separate locations or addresses compared to wired communications. This is the so-called "last mile" problem. Another advantage is mobility. Wireless communication devices, such as cell phones, are not tied by wires to a fixed location. To use wireless communication to access a network, a customer needs to have at least one transceiver in active communication with another transceiver that is connected to the network.

To facilitate wireless communications, the Institute of Electrical and Electronics Engineers (IEEE) has promulgated a number of wireless standards. These include the 802.11 (WiFi) standards and the 802.16 (WiMAX) standards. Likewise, the International Telecommunication Union (ITU) has promulgated standards to facilitate wireless communications. This includes TIA-856, which is also known as Evolution-Data Optimized (EV-DO). This and certain other ITU standards may be known as the CDMA2000 group of standards. The European Telecommunications Standards Institute (ETSI) has also promulgated a standard known as long term evolution (LTE). Additional standards such as the fourth generation communication system (4G) are also being pursued. These standards pursue the aim of providing a comprehensive IP solution where voice, data, and streamed multimedia can be given to users on an "anytime, anywhere" basis. These standards also aim to provide higher data rates than previous generations. All of these standards may include specifications for various aspects of wireless communication with a network. These aspects include processes for registering on the network, carrier modulation, frequency bands of operation, and message formats.

Overview

A method of operating a communication system is disclosed. A plurality of ranging processes are performed to monitor a status of a wireless link associated with a device identifier. A ranging request that includes the device identifier and a message skip indicator is received. It is determined that the device identifier is already associated with the wireless link. A duration since a previously completed ranging process is determined. Based on the duration, and the message skip indicator, it is determined whether to respond to the ranging request.

A method of operating a communication system is disclosed. A ranging request that includes a device identifier associated with a wireless device that is already registered on a network is received. It is determined that the wireless device is associated with an idle state. It is determined whether the ranging request included a base station identifier and a paging controller identifier. Based on whether the ranging request included the base station identifier and the paging controller identifier, it is determined whether to respond to the ranging request.

A communication system is disclosed. The communication system has a communication network. The communication system has a network access system coupled to the communication network. The network access system is configured to provide access to the communication network. The network access system performs a plurality of ranging processes to monitor a status of a wireless link associated with a device identifier. The network access system receives a ranging request that includes the device identifier and a message skip indicator. The network access system determines that the device identifier is already registered with the communication network. The network access system determines a duration since a previously completed ranging process. Based on the duration, and the message skip indicator, the network access system determines whether to respond to the ranging request.

DETAILED DESCRIPTION

In an embodiment, a communication system detects an illegal wireless device attempting to connect to the network. The communication system detects the wireless device is illegal by detecting that there is a wireless device attempting to register with the network using the same device identifier. A medium access control (MAC) address is an example of a device identifier. The communication system attempts to detect a duplicate device identifier involving a minimum amount of network resources. In other words, the communication system attempts to detect a duplicate device identifier first at the base station, then at the access services network gateway (ASN-GW), and finally at the authentication, authorization, and accounting (AAA) server.

In order to differentiate between an illegal wireless device trying to register a duplicate device identifier, and a legitimate wireless device that merely entered a coverage hole, a base station maintains a ranging timer. If this ranging timer is running, and the wireless device is seeking to register with the base station sends a ranging request that includes a message skip indicator, it indicates to the base station that a legitimate wireless device merely entered a coverage hole and is attempting to reestablish communication. However, if the ranging request does not include the message skip indicator it indicates that the wireless device is attempting a full registration. This attempt at full registration indicates to the base station that the ranging request containing the duplicate device identifier is likely not from a legitimate wireless device and thus the ranging request is ignored.

In another embodiment, an illegal wireless device may attempt to register at a different base station from the one presently serving a legitimate wireless device having the same device identifier. In this case, the ASN-GW determines if the device identifier is associated with a wireless device listed as being idle. If the device identifier is associated with a wireless device listed as being idle, the ASN-GW informs the base station of this. In response, the base station checks the ranging request for a serving base station identification and a paging controller identification. If either the serving base station ID, or the paging controller ID, are not present it indicates to the base station that the ranging request containing the duplicate device identifier is likely not from a legitimate wireless device and thus the ranging request is ignored.

Figure 1:
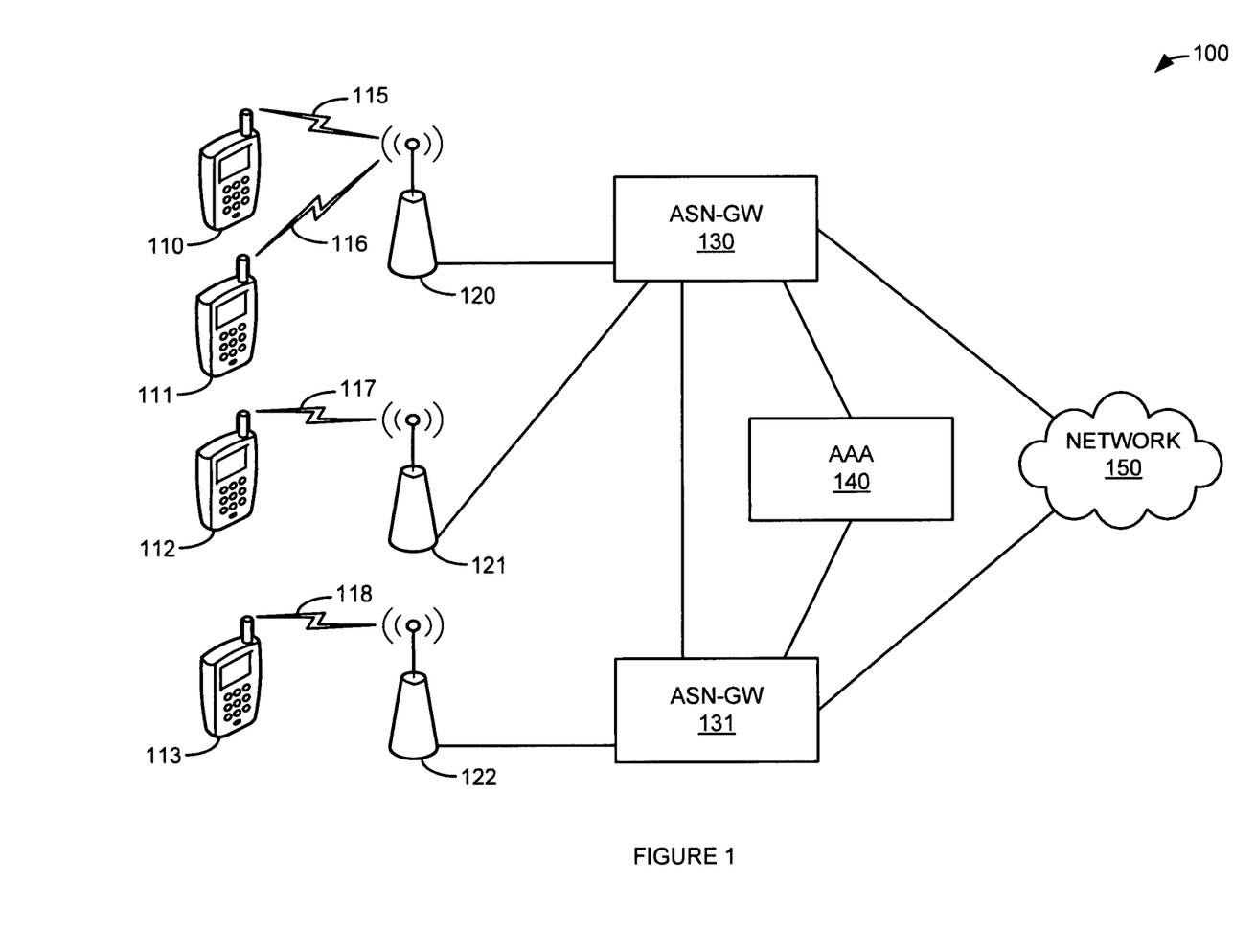
FIG. 1 is a block diagram illustrating a communication system.

FIG. 1 is a block diagram of a communication system. In FIG. 1, communication system 100 comprises wireless devices 110-113, base stations 120-122, ASN-GWs 130-131, AAA 140, and network 150. Wireless device 110 is operatively coupled to base station 120 by wireless link 115. Wireless device 111 is operatively coupled to base station 120 by wireless link 116. Wireless device 112 is operatively coupled to base station 121 by wireless link 117. Wireless device 113 is operatively coupled to base station 122 by wireless link 118.

Base station 120 is operatively coupled to ASN-GW 130. Base station 121 is operatively coupled to ASN-GW 130. Base station 122 is operatively coupled to ASN-GW 131. ASN-GW 130 is operatively coupled to ASN-GW 131. ASN-GW 130 and ASN-GW 131 are operatively coupled to AAA 140 and network 150. Thus, for example, wireless device 110 may be operatively coupled to network 150 via wireless link 115, base station 120, and ASN-GW 130. Likewise, wireless devices 111-113 may be operatively coupled to ASN-GWs 130-131, AAA 140, and network 150.

Wireless devices 110-113 may be any devices, system, combination of devices, or other such communication platform capable of communicating with base stations 120-122 via a corresponding wireless link 115-118. Wireless devices 110-113 may be, or comprise, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange data with base stations 120-122 via a corresponding wireless link 115-118. Other types of communication platforms are possible.

In an example, communication system 100 may be, or include all or parts of an IEEE 802.16 (WiMAX) specified system. These parts may include an access services network (ASN), or connectivity service network (CSN). These parts may include base stations 120-122, ASN-GWs 130-131, AAA 140, and network 150.

Base stations 120-122 may be any wireless system that provides the air interface to wireless devices 110-113, and communication connectivity to network 150 via ASN-GW 130 or 131. Examples of base stations that may be utilized include, base transceiver stations (BTSs), radio base stations (RBSs), Node B, enhanced Node B (eNBs) and others. Base stations may include a number of elements known to those skilled in the art comprising a transceiver, power amplifier, combiner, duplexer, antenna and control function.

Network 150 may comprise a computer, a network, or a collection of computers and networks that couple, link, or otherwise operatively provide wireless devices 110-113 with communication service. It should be understood that network 150 may comprise secondary data networks. For example, network 150 may include a backhaul network, a local network, a long distance network, a packet network, or any combination thereof, as well as other types of networks. Network 150 may be or include an access service network (ASN), wireless local access network access gateway (WAG), packet data gateway (PDG), mobile switching center (MSC) and packet data serving node (PDSN).

In an embodiment, wireless devices 110-113 may establish communication sessions with a corresponding base station 120-122 in order to receive communication services via network 150. These services may include voice services and data services. These services may include but are not limited to telephone services, long distance services, mobile voice services, mobile data services, push-to-talk services, internet services, web browsing, email, pictures, picture messaging, video, video messaging, audio, voicemail, music, MP3's, ring tones, stock tickers, news alerts, and so on.

In an embodiment, wireless device 110 is registered with base station 120. Wireless device 110 is a legitimate wireless device. Wireless devices 111-113 are wireless devices with device identifiers that duplicate wireless device 110's device identifier. Thus, one or more of wireless devices 111-113 may be part of a denial of service (DoS) attack.

Device identifiers may be one or more, but is not limited to, a mobile phone number, a mobile directory number (MDN), mobile identification number (MIN), electronic serial number (ESN), medium access control address (MAC address), or internet protocol address (IP address). Other types of device identifiers are also possible.

In an embodiment, wireless device 111 may be seeking to register with communication system 100 via wireless link 116 using the same device identifier as wireless device 110. Because wireless device 110 is the legitimate user of that device identifier, wireless device 111's use of this device identifier may be a DoS attack. In this case, base station 120 may receive a ranging request via wireless link 116 from wireless device 111. Base station 120 may determine that the device identifier supplied by wireless device 111 in the ranging request is already associated with wireless device 110 (and thus wireless link 115). Thus, base station 120 must determine whether the ranging request is legitimate (i.e., a request from wireless device 110) or an attempted DoS attack (i.e., a request from wireless device 111).

Base station 120 may determine the duration since a previously completed ranging process associated with wireless device 110. To determine this duration, base station 120 may periodically perform a ranging process to monitor the status of wireless link 115. When base station 120 is unable to complete a ranging process with wireless device 110, it may start a timer. This timer may be referred to as a ranging timer. A ranging timer tracks the duration of time since the last completed ranging process with wireless device 110. If this duration exceeds a threshold, base station 120 may determine that wireless device 110 must complete the full entry process to reregister with communication system 100. This ranging timer and process are further described in U.S. patent application Ser. No. 12/533,889, filed Jul. 31, 2009, and titled "WIRELESS COMMUNICATION SYSTEM" and is hereby incorporated by reference herein for all that it describes, shows, and teaches, for all purposes.

If the ranging timer has not exceeded the threshold, then base station 120 may not require the full entry process for a wireless device 111 because it sent a ranging request with the same device identifier as already registered wireless device 110. In this case, in order to determine whether the ranging request from wireless device 111 is legitimate, base station 120 may check the ranging request message to see whether a message skip indicator is present. For example, base station 120 may check the ranging request message to see if a message skip request bit is set. An example of a message skip request bit is bit number two of the WiMAX Ranging Purpose Indication Type/Length/Value (TLV).

If the message skip indicator is not present, this indicates to base station 120 that the ranging request sent by wireless device 111 is likely not a legitimate ranging request. Thus, base station 120 may ignore the ranging request sent by wireless device 111, thus detecting and preventing a DoS attack. If the message skip indicator is present, it indicates to base station 120 that the ranging request is most likely sent by a legitimate wireless device 110. In this case, base station 120 should respond to the ranging request.

In an embodiment, wireless device 112 or 113 may be seeking to register with communication system 100 via wireless links 117 and 118, respectively, using the same device identifier as wireless device 110. Because wireless device 110 is the legitimate user of that device identifier, wireless device 112 or 113's use of this device identifier may be a DoS attack. In this case, base station 120 may receive a ranging request via wireless link 117 or 118 from wireless device 112 or 113, respectively. Because these ranging requests are not received by the same base station that wireless device 110 is registered with, additional elements of communication system 100 may be used to determine that the device identifier supplied by wireless device 112 or 113 in the ranging request is already associated with wireless device 110 (and thus wireless link 115).

In an embodiment, when base station 121 receives a ranging request from wireless device 112, base station 121 checks if the device identifier in the ranging request corresponds to a device identifier associated with an active wireless device registered with base station 121. Since wireless device 110 is registered with base station 120, and wireless device 112 is using the same device identifier as wireless device 110, base station 121 will not immediately associate the device identifier sent by wireless device 112 with a wireless device that is already registered on the network. In response to determining that the device identifier sent by wireless device 112 is not an active device on base station 121, base station 121 passes the device identifier to ASN-GW 130.

ASN-GW 130 receives the device identifier sent by wireless device 112 from base station 121. ASN-GW 130 checks if a wireless device associated with a received device identifier is associated with an idle state. ASN-GW 130 may make this check by comparing a received device identifier with a list of devices known to be in an idle mode. If the received device identifier is not associated with a device and an idle state, ASN-GW 130 informs base station 121 that it should accept and respond to the ranging request. ASN-GW 130 also passes received device identifier to AAA 140 for authentication, authorization, or accounting (e.g., verifying device identifier, user name, or password).

If the received device identifier is associated with a device in an idle state, ASN-GW 130 passes this information back to base station 121. In response to receiving a determination that the ranging request sent by wireless device 112 is associated with the device identifier associated with an idle state, base station 121 checks the ranging request received from wireless device 112 for a base station identifier and a paging controller identifier. If a base station identifier and a paging controller identifier are not present in the ranging request received from wireless device 112, it indicates to base station 121 that this ranging request is likely a DoS attack. Thus, if, after it was determined that the device identifier associated with wireless device 112 is associated with a device in an idle state, and a base station identifier and a paging controller identifier are not present in the ranging request received from wireless device 112, base station 121 will reject the ranging request. Base station 121 may reject the ranging request by not responding to it.

In an embodiment, when base station 122 receives a ranging request from wireless device 113, base station 122 checks if the device identifier in the ranging request corresponds to a device identifier associated with an active wireless device registered with base station 122. Since wireless device 110 is registered with base station 120, and wireless device 113 is using the same device identifier wireless device 110, base station 122 will not immediately associate the device identifier sent by wireless device 113 with a wireless device that is already registered on the network. In response to determining that the device identifier sent by wireless device 113 is not an active device on base station 122, base station 122 passes the device identifier to ASN-GW 131.

ASN-GW 131 receives the device identifier sent by wireless device 113 from base station 122. ASN-GW 131 checks if a wireless device associated by ASN-GW 131 with a received device identifier is associated with an active state, an idle state, or a sleep state. ASN-GW 131 may make this check by comparing a received device identifier with lists of devices known to be in an active state, an idle state, or a sleep state, respectively. If the received device identifier is associated with one of these states, ASN-GW 131 informs base station 122 that it should accept and respond to the ranging request.

If the received device identifier is not associated by ASN-GW 131 with a device in an active state, an idle state, or a sleep state, ASN-GW 131 passes this information to neighboring ASN-GWs, such as ASN-GW 130. ASN-GW 130 checks to see if the device identifier passed to it by ASN-GW 131 is associated with an active state, an idle state, or a sleep state. ASN-GW 130 passes the results of this check back to ASN-GW 131.

If ASN-GW 130 informs ASN-GW 131 that the device identifier it received from ASN-GW 131 is not associated with an active state, an idle state, or a sleep state, ASN-GW 131 passes received device identifier to AAA 140 for authentication, authorization, or accounting. If ASN-GW 130 informs ASN-GW 131 that the device identifier it received from ASN-GW 131 is associated with an active state, an idle state, or a sleep state, ASN-GW 131 informs base station 122 that it should accept and respond to the ranging request.

If the received device identifier is associated with a device in an idle state, ASN-GW 131 passes this information back to base station 122. In response to receiving a determination that the ranging request sent by wireless device 113 is associated with the device identifier associated with an idle state, base station 122 checks the ranging request received from wireless device 113 for a base station identifier and a paging controller identifier. If a base station identifier and a paging controller identifier are not present in the ranging request received from wireless device 113, it indicates to base station 122 that this ranging request is likely a DoS attack. Thus, if, after it was determined that the device identifier associated with wireless device 113 is associated with a device in an idle state, and a base station identifier and a paging controller identifier are not present in the ranging request received from wireless device 113, base station 122 may reject the ranging request. Base station 122 may reject the ranging request by not responding to it.

Figure 2:
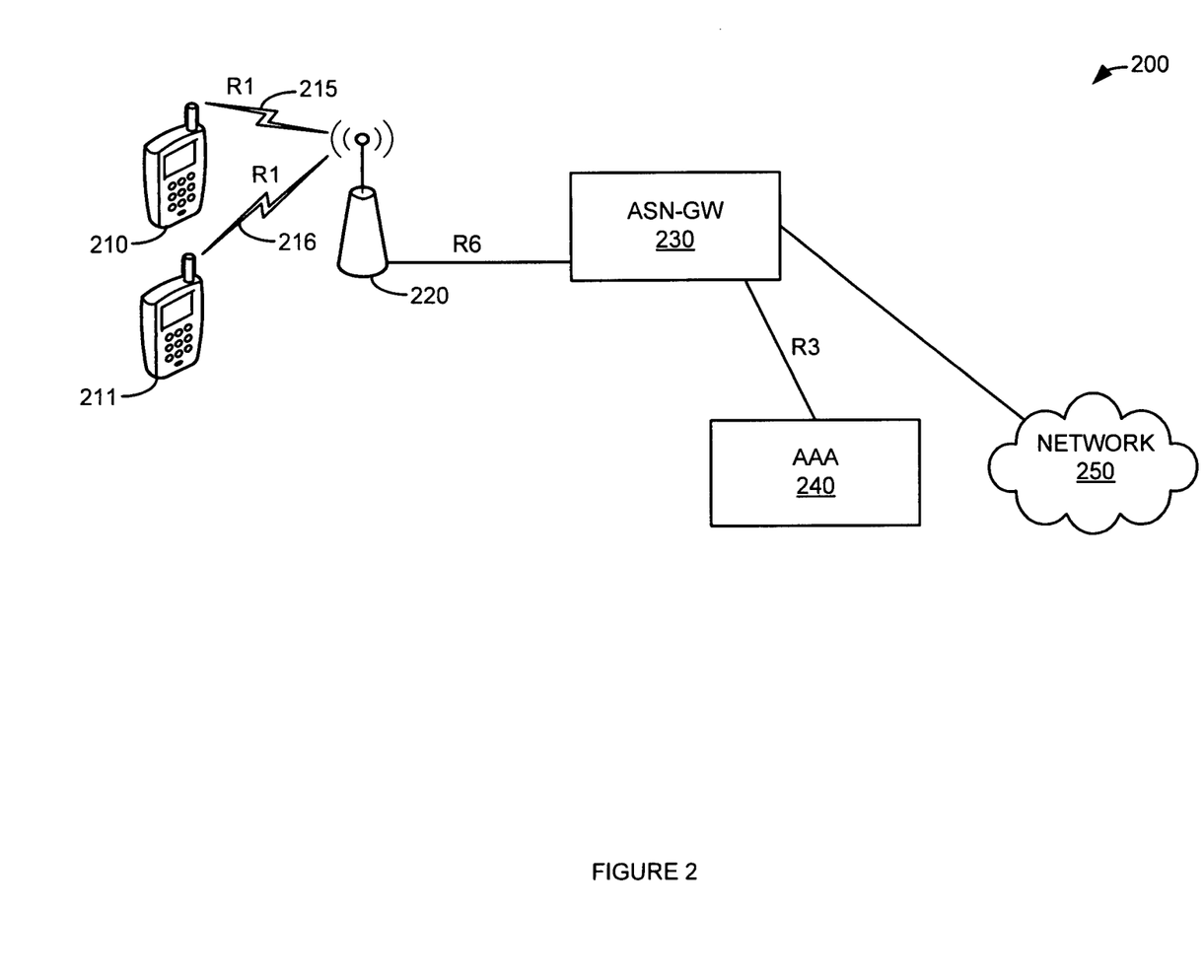
FIG. 2 is a block diagram illustrating a data flow configuration of a communication system.

FIG. 2 is a block diagram illustrating a data flow configuration of a communication system. FIG. 2 illustrates data flows associated with illegitimate wireless device 211 attempting to use the same MAC address on the same base station 220 as legitimate wireless device 210.

In FIG. 2, communication system 200 comprises legitimate wireless device 210, illegitimate wireless device 211, base station 220, ASN-GW 230, AAA 240, and network 250. Legitimate wireless device 210 is operatively coupled to base station 220 by wireless link 215. Wireless link 215 may be an R1 link. Illegitimate wireless device 211 may be operatively coupled to base station 220 by wireless link 216. Wireless link 216 may be an R1 link.

Base station 220 is operatively coupled to ASN-GW 230. Base station 220 may be operatively coupled to ASN-GW 230 via an R6 link. ASN-GW 230 is operatively coupled to AAA 240 and network 250. ASN-GW 230 may be operatively coupled to AAA 240 via an R3 link. Thus, for example, legitimate wireless device 210 may be operatively coupled to network 250 via wireless link 215, base station 220, and ASN-GW 230.

Legitimate wireless device 210 and illegitimate wireless device 211 may be any devices, system, combination of devices, or other such communication platform capable of communicating with base station 220 via wireless link 215 and wireless link 216, respectively. Legitimate wireless device 210 and illegitimate wireless device 211 may be, or comprise, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange data with base station 220 via a corresponding wireless link 215-216. Other types of communication platforms are possible.

In an example, communication system 200 may be, or include all or parts of an IEEE 802.16 (WiMAX) specified system. These parts may include an access services network (ASN), or connectivity service network (CSN). These parts may include base station 220, ASN-GW 230, AAA 240, and network 250.

Base station 220 may be any wireless system that can provide an air interface to legitimate wireless device 210 and illegitimate wireless device 211, and communication connectivity to network 250 via ASN-GW 230. Examples of base stations that may be utilized include, base transceiver stations (BTSs), radio base stations (RBSs), Node B, enhanced Node B (eNBs) and others. Base stations may include a number of elements known to those skilled in the art comprising a transceiver, power amplifier, combiner, duplexer, antenna and control function.

Network 250 may comprise a computer, a network, or a collection of computers and networks that couple, link, or otherwise can operatively provide legitimate wireless device 210 and illegitimate wireless device 211 with communication service. It should be understood that network 250 may comprise secondary data networks. For example, network 250 may include a backhaul network, a local network, a long distance network, a packet network, or any combination thereof, as well as other types of networks. Network 250 may be or include an access service network (ASN), wireless local access network access gateway (WAG), packet data gateway (PDG), mobile switching center (MSC) and packet data serving node (PDSN).

In an embodiment, legitimate wireless device 210 may establish communication sessions with base station 220 in order to receive communication services via network 250. These services may include voice services and data services. These services may include but are not limited to telephone services, long distance services, mobile voice services, mobile data services, push-to-talk services, internet services, web browsing, email, pictures, picture messaging, video, video messaging, audio, voicemail, music, MP3's, ring tones, stock tickers, news alerts, and so on.

In an embodiment, legitimate wireless device 210 is registered with base station 220. Illegitimate wireless device 211 is a wireless device with a MAC address that duplicates legitimate wireless device 210's MAC address. Thus, wireless device 211 may be part of a denial of service (DoS) attack. Illegitimate wireless device 211 may be attempting to deny service to legitimate wireless device 210 by causing communication system 200 to stop providing communication service to legitimate wireless device 210.

In an embodiment, illegitimate wireless device 211 may seek to register with communication system 200 via wireless link 216 using the same MAC address as legitimate wireless device 210. Because legitimate wireless device 210 is the only valid user of that MAC address, illegitimate wireless device 211's use of this MAC address may be a DoS attack. In this case, base station 220 may receive a ranging request via wireless link 216 from wireless device 211. Base station 220 may determine that the MAC address supplied by illegitimate wireless device 211 in the ranging request is already associated with legitimate wireless device 210 (and thus wireless link 215). Thus, base station 220 must determine whether the ranging request is legitimate (i.e., as request from legitimate wireless device 210), or an attempted DoS attack (i.e., a request from illegitimate wireless device 211).

Base station 220 may determine the duration since a previously completed ranging process associated with legitimate wireless device 210. To determine this duration, base station 220 may periodically perform a ranging process to monitor the status of wireless link 215. When base station 220 is unable to complete a ranging process with legitimate wireless device 210 it may start a ranging timer. This ranging timer tracks the duration of time since the last completed ranging process with legitimate wireless device 210. If this duration exceeds a threshold, base station 220 may determine that legitimate wireless device 210 must complete the full entry process to reregister with communication system 200. This ranging timer and process are further described in U.S. patent application Ser. No. 12/533,889, filed Jul. 31, 2009, and titled "WIRELESS COMMUNICATION SYSTEM" and is hereby incorporated by reference herein for all that it describes, shows, and teaches, for all purposes.

If the ranging timer has not exceeded the threshold, then base station 220 may not typically require the full entry process for illegitimate wireless device 211 in response to illegitimate wireless device's ranging request. This is because illegitimate wireless device 211 sent a ranging request with the same MAC address as already registered legitimate wireless device 210. In this case, in order to determine whether to respond to illegitimate wireless device 211's ranging request, base station 220 may check the received ranging request message to see whether a message skip indicator is present. For example, base station 220 may check the received ranging request message to see if a message skip request bit is set. An example of a message skip request bit is bit number two of the WiMAX Ranging Purpose Indication TLV.

If the message skip indicator is not present, it indicates to base station 220 that the ranging request sent by illegitimate wireless device 211 is not a legitimate ranging request. Thus, base station 220 may ignore or reject the ranging request sent by illegitimate wireless device 211. This detects and prevents a DoS attack. If the message skip indicator is present, it indicates to base station 220 that the ranging request is most likely sent by legitimate wireless device 210. In this case, base station 220 should respond to the ranging request.

Figure 3:
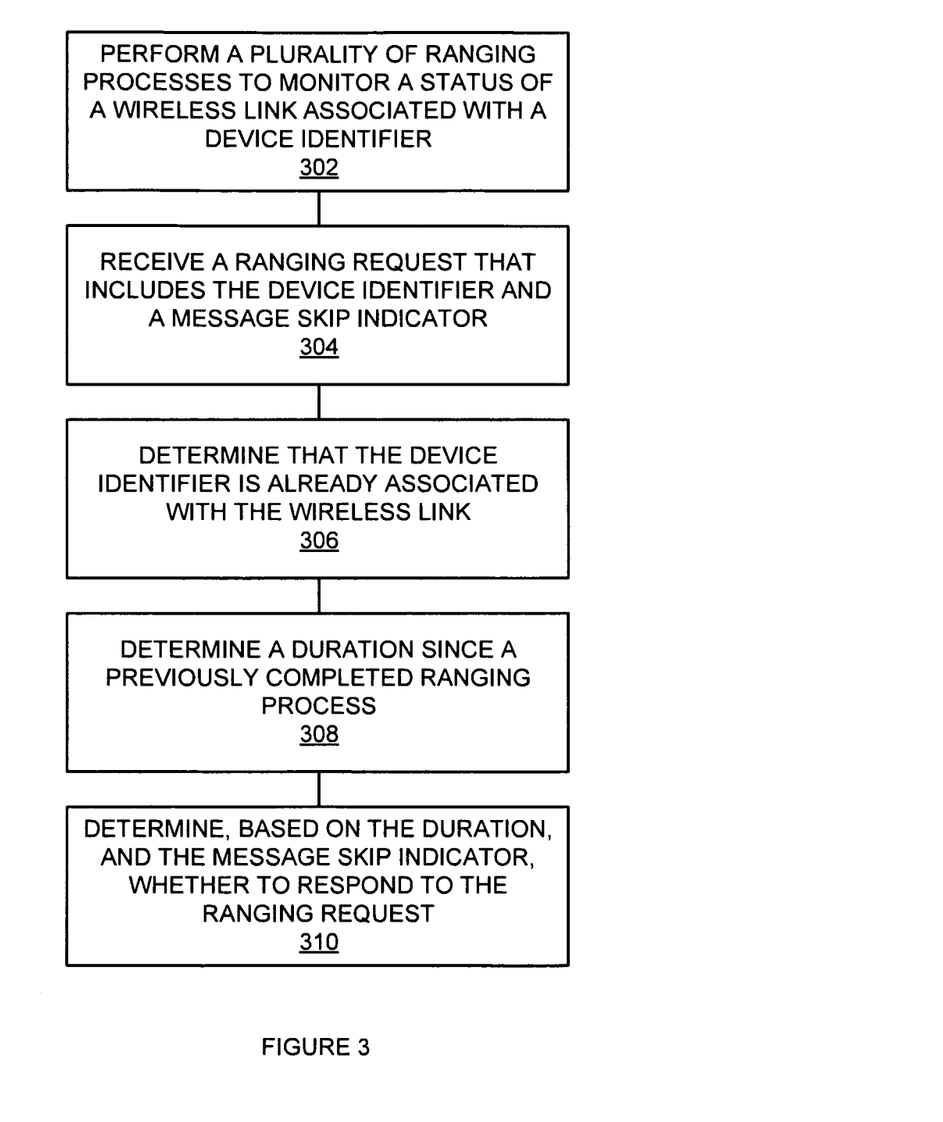
FIG. 3 is a flowchart illustrating a method of operating a communication system.

FIG. 3 is a flowchart illustrating a method of operating a communication system. The step illustrated in FIG. 3 may be performed by one or more elements of communication system 100 or communication system 200.

A plurality of ranging processes are performed to monitor a status of a wireless link associated with a device identifier (302). For example, base station 220 may periodically initiate and complete ranging processes with legitimate wireless device 210 to monitor the status of wireless link 215. If base station 220 is unable to complete one or more of these ranging processes, base station 220 may start a ranging timer. If that ranging timer reaches a threshold, then base station 220 may determine that legitimate wireless device 220 must complete a full network entry process in order to resume communication with communication system 200.

A ranging request that includes the device identifier and a message skip indicator is received (304). For example, base station 220 may receive a ranging request that includes a message skip indicator, and a MAC address associated with legitimate wireless device 210. The device identifier is determined to already be associated with the wireless link (306). For example, base station 220 may determine that the MAC address received in block 304 is already associated with wireless link 215.

A duration since a previously completed ranging process is determined (308). For example, base station 220 may determine a duration since a last completed ranging processes with legitimate wireless device 210. This duration may yet to have exceeded a threshold. This threshold may determine whether legitimate wireless device 210 must complete a full network entry process in order to resume communication with communication system 200.

Based on the duration, and the message skip indicator, it is determined whether to respond to the ranging request (310). For example, based on the duration not exceeding a threshold, and the ranging request including a message skip indicator, base station 220 may determine to respond to the ranging request. In another example, based on the duration exceeding the threshold, or the ranging request not including the message skip indicator, base station 220 may determine that more information is needed before responding to the ranging request. In this case, base station 220 may query ASN-GW 230 and/or AAA 240 for information to determine whether to respond to the ranging request.

Figure 4:
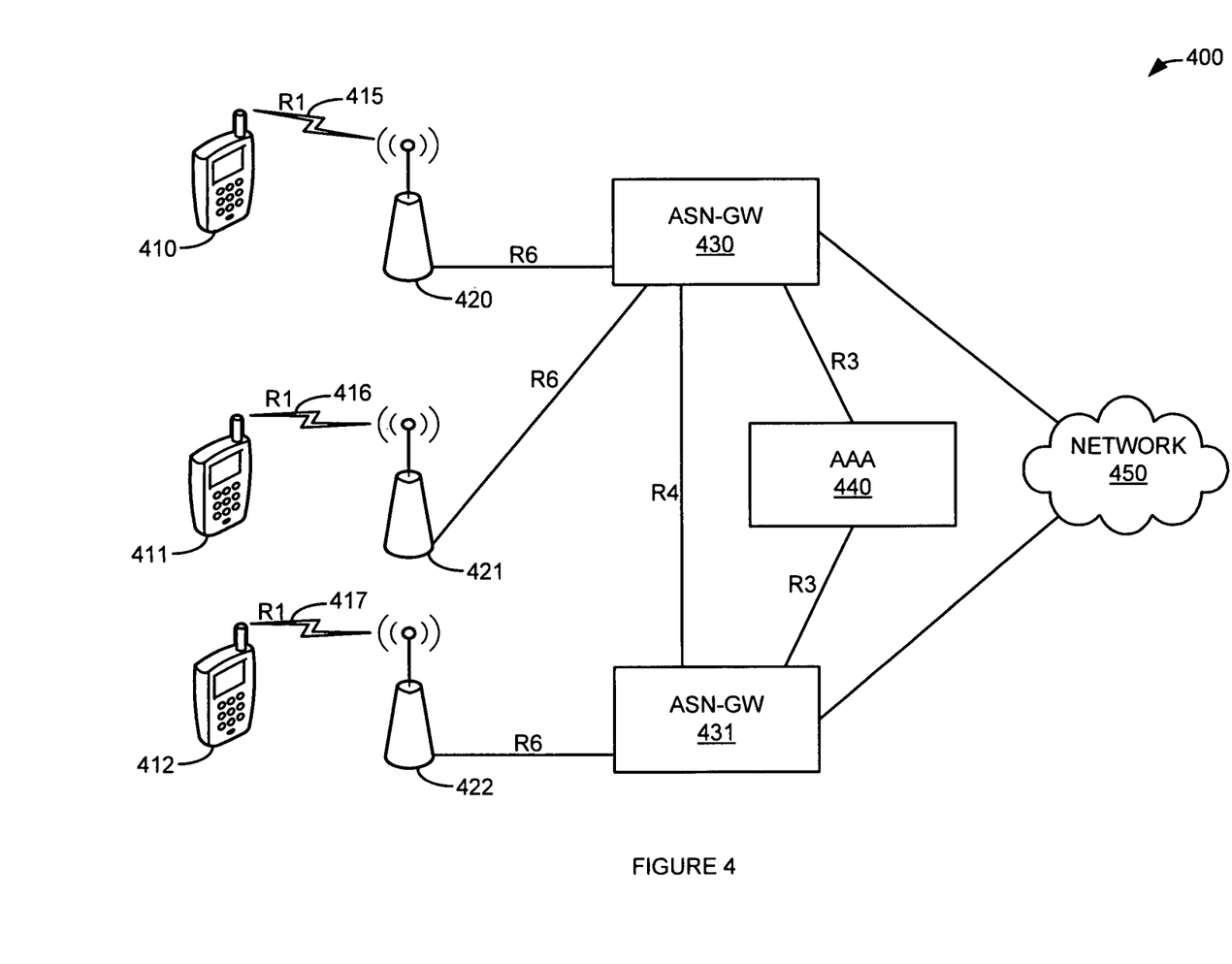
FIG. 4 is a block diagram illustrating a data flow configuration of a communication system.

FIG. 4 is a block diagram illustrating a data flow configuration of a communication system. FIG. 4 illustrates data flows associated with illegitimate wireless device 411 or illegitimate wireless device 412 attempting to use the same MAC address as legitimate wireless device 410, but on a different base station 421 and 422, respectively.

In FIG. 4, communication system 400 comprises legitimate wireless device 410 and illegitimate wireless device 411 and 412, base stations 420-422, ASN-GWs 430-431, AAA 440, and network 450. Legitimate wireless device 410 is operatively coupled to base station 420 by wireless link 415. Wireless link 415 may be an R1 link. Illegitimate wireless device 411 may be operatively coupled to base station 421 by wireless link 416. Wireless link 416 may be an R1 link. Illegitimate wireless device 412 may be operatively coupled to base station 422 by wireless link 417. Wireless link 417 may be an R1 link.

Base station 420 is operatively coupled to ASN-GW 430. Base station 420 may be operatively coupled to ASN-GW 430 via an R6 link. Base station 421 is operatively coupled to ASN-GW 430. Base station 421 may be operatively coupled to ASN-GW 430 via an R6 link. Base station 422 is operatively coupled to ASN-GW 431. Base station 422 may be operatively coupled to ASN-GW 431 via an R6 link. ASN-GW 430 is operatively coupled to ASN-GW 431. ASN-GW 430 may be operatively coupled to ASN-GW 431 via an R4 link. ASN-GW 430 and ASN-GW 431 are operatively coupled to AAA 440 and network 450. ASN-GW 430 and ASN-GW 431 may be operatively coupled to AAA 440 via an R3 link. Thus, for example, legitimate wireless device 410 may be operatively coupled to network 450 via wireless link 415, base station 420, and ASN-GW 430.

Legitimate wireless device 410 and illegitimate wireless devices 411 and 412 may be any devices, system, combination of devices, or other such communication platform capable of communicating with base stations 420-422 via a corresponding wireless link 415-417. Legitimate wireless device 410 and illegitimate wireless devices 411 and 412 may be, or comprise, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange data with base stations 420-422 via a corresponding wireless link 415-417. Other types of communication platforms are possible.

In an example, communication system 400 may be, or include all or parts of an IEEE 802.16 (WiMAX) specified system. These parts may include an access services network (ASN), or connectivity service network (CSN). These parts may include base stations 420-422, ASN-GWs 430-431, AAA 440, and network 450.

Base stations 420-422 may be any wireless system that can provide an air interface to legitimate wireless device 410 and illegitimate wireless devices 411 and 412, and communication connectivity to network 450 via ASN-GW 430 or 431. Examples of base stations that may be utilized include, base transceiver stations (BTSs), radio base stations (RBSs), Node B, enhanced Node B (eNBs) and others. Base stations may include a number of elements known to those skilled in the art comprising a transceiver, power amplifier, combiner, duplexer, antenna and control function.

Network 450 may comprise a computer, a network, or a collection of computers and networks that couple, link, or otherwise operatively provide legitimate wireless device 410 and illegitimate wireless devices 411 and 412 with communication service. It should be understood that network 450 may comprise secondary data networks. For example, network 450 may include a backhaul network, a local network, a long distance network, a packet network, or any combination thereof, as well as other types of networks. Network 450 may be or include an access service network (ASN), wireless local access network access gateway (WAG), packet data gateway (PDG), mobile switching center (MSC) and packet data serving node (PDSN).

In an embodiment, legitimate wireless device 410 may establish communication sessions with a base station 420 in order to receive communication services via network 450. These services may include voice services and data services. These services may include but are not limited to telephone services, long distance services, mobile voice services, mobile data services, push-to-talk services, internet services, web browsing, email, pictures, picture messaging, video, video messaging, audio, voicemail, music, MP3's, ring tones, stock tickers, news alerts, and so on.

In an embodiment, legitimate wireless device 410 is registered with base station 420. Illegitimate wireless device 411 and 412 are wireless devices with device identifiers that duplicate wireless device 410's device identifier. Thus, illegitimate wireless devices 411 and 412 may be part of a denial of service (DoS) attack.

Device identifiers may be one or more, but is not limited to, a mobile phone number, a mobile directory number (MDN), mobile identification number (MIN), electronic serial number (ESN), medium access control address (MAC address), or internet protocol address (IP address). Other types of device identifiers are also possible.

In an embodiment, illegitimate wireless devices 411 or 412 may be seeking to register with communication system 400 via wireless link 416 or 417, respectively, using the same device identifier as legitimate wireless device 410. Because legitimate wireless device 410 is the valid user of that device identifier, illegitimate wireless device 411 or 412's use of this device identifier may be a DoS attack. In this case, base stations 421 and 422 may receive a ranging request via wireless link 416 or 417. Because these ranging requests are not received by the same base station that legitimate wireless device 410 is registered with, additional elements of communication system 400 may be used to determine that the device identifier supplied by illegitimate wireless device 411 or 412 in a ranging request is already associated with legitimate wireless device 410 (and thus wireless link 415).

In an embodiment, when base station 421 receives a ranging request from illegitimate wireless device 411, base station 421 checks if the device identifier in the ranging request corresponds to a device identifier associated with an active wireless device registered with base station 421. Since legitimate wireless device 410 is registered with base station 420, and illegitimate wireless device 411 is using the same device identifier as legitimate wireless device 410, base station 421 will not immediately associate the device identifier sent by illegitimate wireless device 411 with a wireless device that is already registered on the network. In response to determining that the device identifier sent by illegitimate wireless device 411 is not an active device on base station 421, base station 421 passes the device identifier to ASN-GW 430.

ASN-GW 430 receives the device identifier sent by illegitimate wireless device 411 from base station 421. ASN-GW 430 checks if a wireless device associated with a received device identifier is associated with an idle state. ASN-GW 430 may make this check by comparing a received device identifier with a list of devices known to be in an idle mode. If the received device identifier is not associated with a device in an idle state, ASN-GW 430 informs base station 421 that it should accept and respond to the ranging request. ASN-GW 430 also passes the received device identifier to AAA 440 for authentication, authorization, or accounting (e.g., verifying device identifier, user name, or password).

If the received device identifier is associated with a device in an idle state, ASN-GW 430 passes this information back to base station 421. In response to receiving a determination that the ranging request sent by illegitimate wireless device 411 is associated with a device identifier associated with an idle state, base station 421 checks the ranging request received from illegitimate wireless device 411 for a base station identifier and a paging controller identifier. If either a base station identifier or a paging controller identifier are not present in the ranging request received from illegitimate wireless device 411, it indicates to base station 421 that this ranging request is likely a DoS attack. Thus, if, it was determined that the device identifier associated with illegitimate wireless device 411 is associated with a device in an idle state, and either a base station identifier or a paging controller identifier are not present in the ranging request received from illegitimate wireless device 411, base station 421 will reject the ranging request. Base station 421 may reject the ranging request by not responding to it.

In an embodiment, when base station 422 receives a ranging request from illegitimate wireless device 412, base station 422 checks if the device identifier in the ranging request corresponds to a device identifier associated with an active wireless device registered with base station 422. Since legitimate wireless device 410 is registered with base station 420, and illegitimate wireless device 412 is using the same device identifier as legitimate wireless device 410, base station 422 will not associate the device identifier sent by illegitimate wireless device 412 with a wireless device that is already registered on the network. In response to determining that the device identifier sent by illegitimate wireless device 412 is not an active device on base station 422, base station 422 passes the device identifier to ASN-GW 431.

ASN-GW 431 receives the device identifier sent by illegitimate wireless device 412 from base station 422. ASN-GW 431 checks if a wireless device associated by ASN-GW 431 with the received device identifier is associated with an active state, an idle state, or a sleep state. ASN-GW 431 may make this check by comparing a received device identifier with lists of devices known to be in an active state, an idle state, or a sleep state, respectively.

If the received device identifier is not associated by ASN-GW 431 with a device in an active state, an idle state, or a sleep state, ASN-GW 431 passes this information to neighboring ASN-GWs, such as ASN-GW 430. ASN-GW 430 checks to see if the device identifier passed to it by ASN-GW 431 is associated with an active state, an idle state, or a sleep state. ASN-GW 430 passes the results of this check back to ASN-GW 431.

If ASN-GW 430 informs ASN-GW 431 that the device identifier it received from ASN-GW 431 is not associated with an active state, an idle state, or a sleep state, ASN-GW 431 passes the received device identifier to AAA 440 for authentication, authorization, or accounting.

If the received device identifier is associated with a device in an idle state, ASN-GW 431 passes this information back to base station 422. In response to receiving a determination that the ranging request sent by wireless device 412 is associated with the device identifier associated with an idle state, base station 422 checks the ranging request received from wireless device 412 for a base station identifier and a paging controller identifier. If a base station identifier and a paging controller identifier are not present in the ranging request received from wireless device 412, it indicates to base station 422 that this ranging request is likely a DoS attack. Thus, if, after it was determined that the device identifier associated with wireless device 412 is associated with a device in an idle state, and a base station identifier and a paging controller identifier are not present in the ranging request received from wireless device 412, base station 422 may reject the ranging request. Base station 422 may reject the ranging request by not responding to it.

Figure 5:
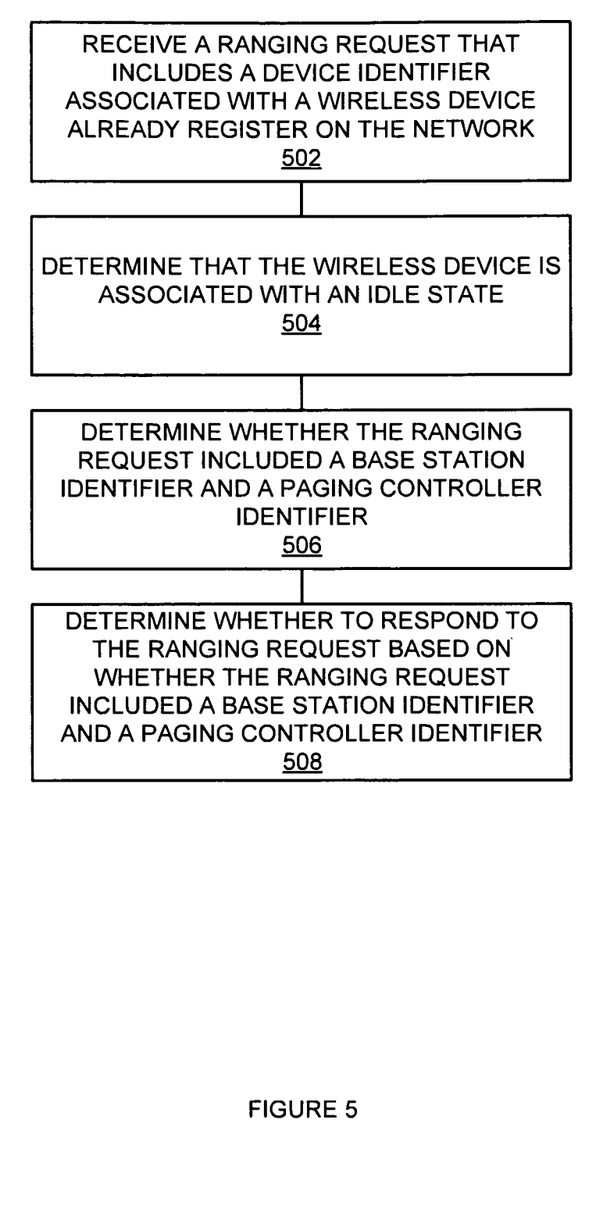
FIG. 5 is a flowchart illustrating a method of operating a communication system.

FIG. 5 is a flowchart illustrating a method of operating a communication system. The steps illustrated in FIG. 5 may be performed by one or more elements of communication system 100, communication system 200, or communication system 400.

A ranging request that includes a device identifier associated with a wireless device already registered on the network is received (502). For example, base station 421 may receive, from illegitimate wireless device 411, a device identifier that is associated with legitimate wireless device 410. Legitimate wireless device 410 may be already registered with communication system 400.

The wireless device is determined to be in an idle state (504). For example, ASN-GW 430 may determine that legitimate wireless device 410 is associated with an idle state. It is determined whether the ranging request included a base station identifier and a paging controller identifier (506). For example, base station 421 may determine whether the ranging request received in block 502 included both a base station identifier and a paging controller identifier.

It is determined whether to respond to the ranging request based on whether the ranging request included a base station identifier and a paging controller identifier (510). For example, base station 421 may determine not to respond to the ranging request based on the absence of either a base station identifier or a paging controller identifier in the ranging request received in block 502.

Figure 6:
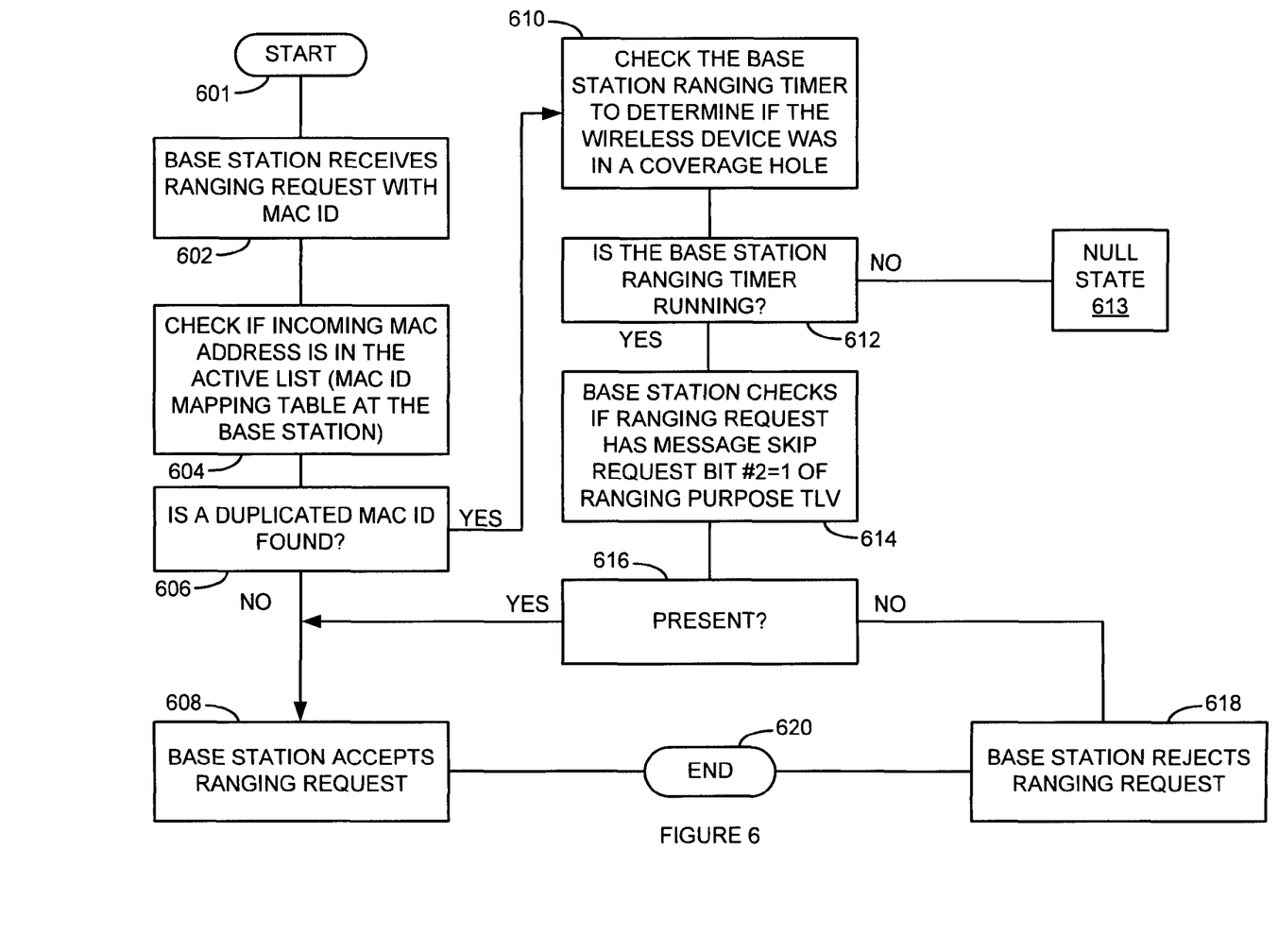
FIG. 6 is a flowchart illustrating a method of operating a communication system.

FIG. 6 is a flowchart illustrating a method of operating a communication system. The steps illustrated in FIG. 6 may be performed by one or more elements of communication system 100, communication system 200, or communication system 400. In an embodiment, the flow illustrated in FIG. 6 may be performed when the ranging timer is running at the base station, and the wireless device is active, in sleep mode, or in a coverage hole.

The process illustrated in FIG. 6 begins in block 601 and proceeds to block 602. A base station receives a ranging request with a MAC ID (602). For example, base station 120 may receive a ranging request that contains a MAC ID from wireless device 111. The incoming MAC address is checked to see if it is in the active list (604). In other words, the MAC ID is checked to determine if it is in the mapping table of the base station. For example, base station 120 may check its list of active MAC ID's to determine if the MAC ID it received from wireless device 111 is present. In another example, base station one trying may check its list of active MAC ID's to determine if the received MAC ID is a duplicate of one in its list of active MAC ID's.

If a duplicate MAC ID is found, flow proceeds to block 610. If a duplicate MAC ID is not found, flow proceeds to block 608 (606). The base station accepts the ranging request (608). The base station accepts the ranging request because it did not find a duplicate MAC ID in block 606. After the base station accepts the ranging request, the process ends in block 620.

The base station ranging timer is checked to determine if the wireless device was in a coverage hole (610). For example, base station 120 may check a ranging timer used to determine if the wireless device associated with a MAC ID received in the ranging request may have been in a coverage hole. An example of this ranging timer has been described previously. From block 610, flow proceeds to block 612.

If the base station ranging timer is not working, flow proceeds to null state 613. If the base station ranging timer is working flow proceeds to block 614 (612). The base station checks if the ranging request has a message skip request bit #2 of the ranging purpose TLV equal to one (e.g., Bit #2=1) (614).

If the skip request bit is not present, or is not equal to one, flow proceeds to block 618. If the skip request bit is present and is equal to one, flow proceeds to block 608 (616). In block 618, the base station rejects the ranging request and then flow ends in block 620. In block 608, the base station accepts the ranging request and then flow ends in block 620.

Figure 7:
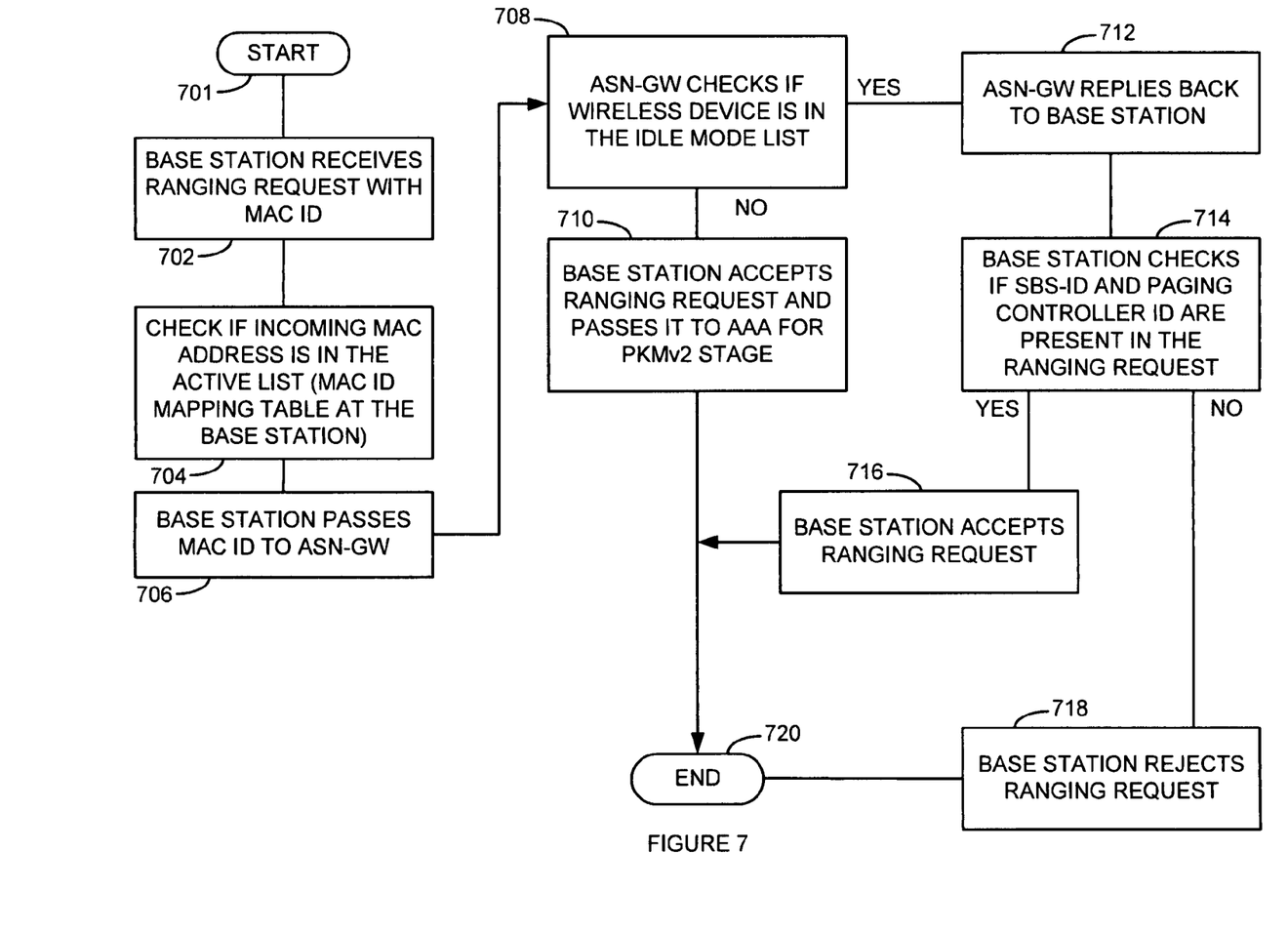
FIG. 7 is a flowchart illustrating a method of operating a communication system.

FIG. 7 is a flowchart illustrating a method of operating a communication system. The steps illustrated in FIG. 7 may be performed by one or more elements of communication system 100, communication system 200, or communication system 400. In an embodiment, the flow illustrated in FIG. 7 may be performed when the ranging timer is not running at the base station, and the wireless device is in idle mode.

The process illustrated in FIG. 7 begins in block 701 and proceeds to block 702. A base station receives a ranging request with a MAC ID (702). For example, base station 121 may receive a ranging request that contains a MAC ID from wireless device 112. The incoming MAC address is checked to see if it is in the active list (704). In other words, the MAC ID is checked to determine if it is in the mapping table of the base station. For example, base station 121 may check its list of active MAC ID's to determine if the MAC ID it received from wireless device 112 is present. In another example, base station 121 may check its list of active MAC ID's to determine if the received MAC ID is a duplicate of one in its list of active MAC ID's.

The base station passes the MAC ID to an ASN-GW (706). For example, base station 121 may pass the MAC ID to ASN-GW 130. To ASN-GW checks if the wireless device is in the idle mode list. If the wireless device (i.e., it's MAC ID) is in the ASN-GW's idle mode list, flow proceeds to block 712. If the wireless device is not in the ASN-GW's idle mode list, flow proceeds to block 710 (708).

If the wireless device is not in the ASN-GW's idle mode list, the base station accepts the ranging request and passes it to AAA for PKMv2 stage (710). Flow then terminates in block 720.

If the wireless device (i.e., it's MAC ID) is in the ASN-GW's idle mode list, the ASN-GW replies back to the base station (712). For example, if ASN-GW 130 detected the received MAC ID in its idle mode list, ASN-GW 130 would pass this information back to base station 121.

The base station checks if an SBS-ID (serving base station ID) and paging controller ID are present in the ranging request. If an SBS-ID and paging controller ID are present in the ranging request, flow proceeds to block 716. If an SBS-ID and paging controller ID are not present in the ranging request, flow proceeds to block 718 (714).

If an SBS-ID and paging controller ID were present in the ranging request, the base station accepts the ranging request (716). Flow then ends in block 720. If an SBS-ID and paging controller ID were not present in the ranging request, the base station rejects the ranging request (718). Flow then ends in block 720.

Figure 8:
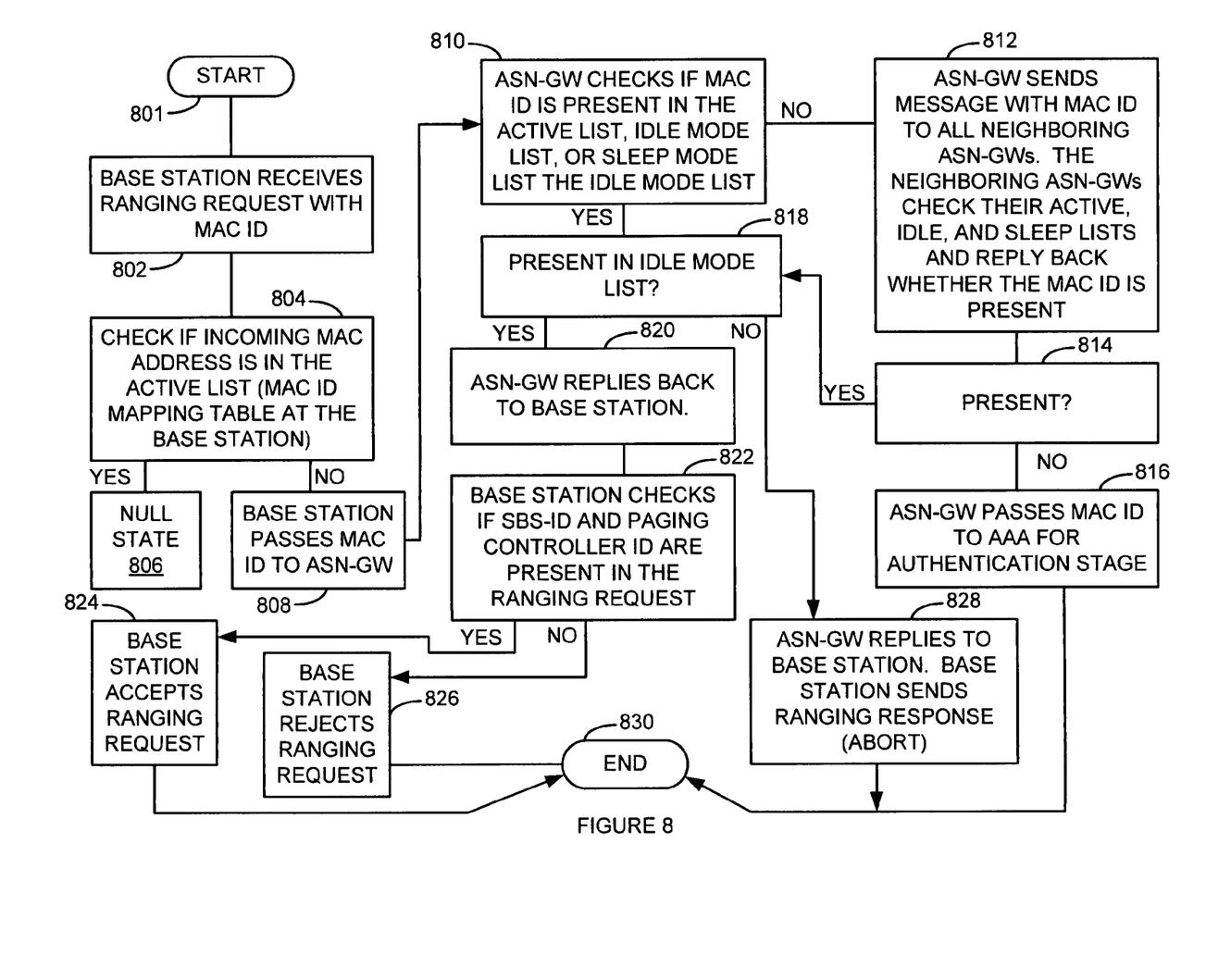
FIG. 8 is a flowchart illustrating a method of operating a communication system.

FIG. 8 is a flowchart illustrating a method of operating a communication system. The steps illustrated in FIG. 8 may be performed by one or more elements of communication system 100, communication system 200, or communication system 400. In an embodiment, the flow illustrated in FIG. 8 may be performed when the ranging timer is not running at the base station.

The process illustrated in FIG. 8 begins in block 801 and proceeds to block 802. A base station receives a ranging request with a MAC ID (802). For example, base station 422 may receive a ranging request that contains a MAC ID from wireless device 412. The incoming MAC address is checked to see if it is in the active list (804). In other words, the MAC ID is checked to determine if it is in the mapping table of the base station. For example, base station 422 may check its list of active MAC ID's to determine if the MAC ID it received from wireless device 412 is present. In another example, base station 422 may check its list of active MAC ID's to determine if the received MAC ID is a duplicate of one in its list of active MAC ID's.

If the incoming MAC ID was in the active list, flow proceeds to null state 806. If the incoming MAC ID was not in the active list, the base station passes the MAC ID to an ASN-GW (808). Flow proceeds to block 810.

The ASN-GW checks if the MAC ID is present in the active list, idle mode list, or sleep mode list. If the MAC ID was not present in any of the active list, idle mode list, or sleep mode list, flow proceeds to block 812. If the MAC ID was present in any of the active list, idle mode list, or sleep mode list, flow proceeds to block 818 (810).

If the MAC ID was not present in any of the active list, idle mode list, or sleep mode list, the ASN-GW sends a message with the MAC ID to all the neighboring ASN-GWs. The neighboring ASN-GW's check their active, idle, and sleep lists and reply back with whether the MAC ID is present (812).

If none of the neighboring ASN-GW's determined the MAC ID was present, flow proceeds to block 816. If one or more of the neighboring ASN-GW's determined that the MAC ID was present, flow proceeds to block 818 (814).

If none of the neighboring ASN-GW's determined the MAC ID was present, the ASN-GW passes the MAC ID 28 AAA for authentication stage (816). After authentication in block 816, flow ends in block 830.

If one or more of the neighboring ASN-GW's determined that the MAC ID was present, it is determined whether the MAC ID was in the idle mode list. If the MAC ID was not in the idle mode list, flow proceeds to block 828. If the MAC ID was in an idle mode list, flow proceeds to block 820 (818).

If the MAC ID was in the idle mode list, the ASN-GW replies back to the base station with this information (820). Flow proceeds to block 822. The base station checks if an SBS-ID and paging controller ID are present in the ranging request. If an SBS-ID and paging controller ID were present in the ranging request, flow proceeds to block 824. If an SBS-ID and paging controller ID are not both present in the ranging request, flow proceeds to block 826 (822).

If an SBS-ID and paging controller ID were present in the ranging request, the base station accepts the ranging request (824). Flow then ends in block 830. If an SBS-ID and paging controller ID are not both present in the ranging request, the base station rejects the ranging request (826). Flow then ends in block 830.

If (in block 818) the MAC ID was not in an idle mode list, the ASN-GW replies to the base station with this information. The base station sends a ranging response (abort) (828). Flow then ends in block 830.

Figure 9:
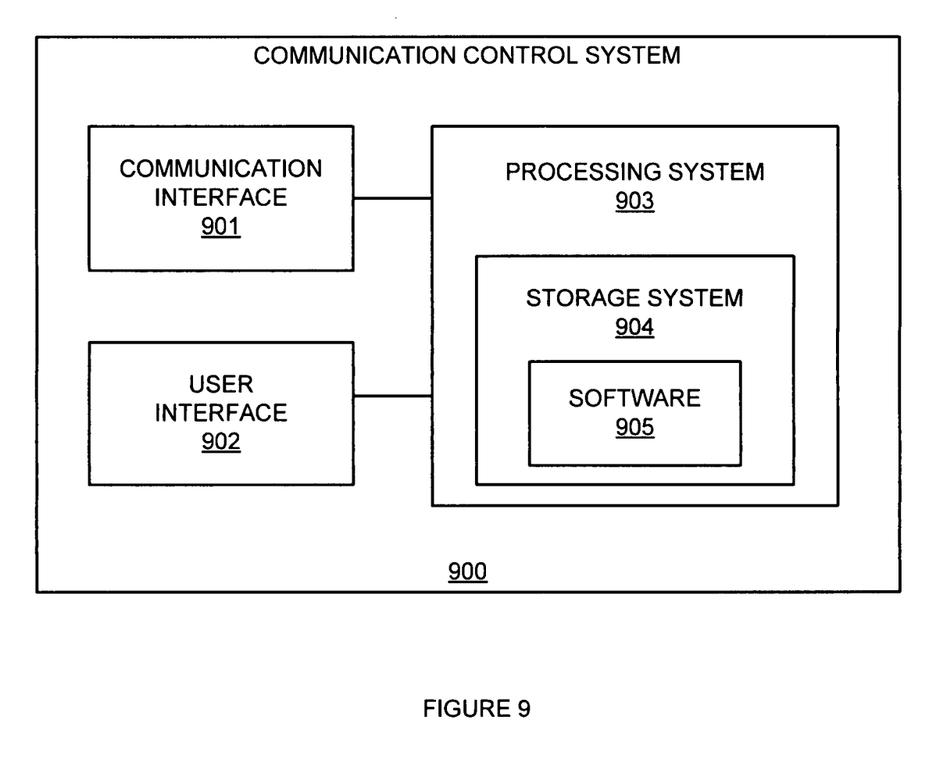
FIG. 9 is a block diagram of a communication control system.

FIG. 9 illustrates communication control system 900. Communication control system 900 may be an example of one or more components of base stations 120-122, ASN-GWs 130-131, AAA 140, base station 220, ASN-GW 230, AAA 240, base stations 420-422, ASN-GWs 430-431, and AAA 440, although these devices may use alternative configurations. Communication control system 900 comprises communication interface 901, user interface 902, and processing system 903. Processing system 903 is linked to communication interface 901 and user interface 902. Processing system 903 includes storage system 904 that stores software 905.

Communication interface 901 comprises components that communicate over communication links, such as network cards, ports, RF transceivers, processing circuitry and software, or some other communication devices. Communication interface 901 may be configured to communicate over metallic, wireless, or optical links. Communication interface 901 may be configured to use TDM, IP, Ethernet, optical networking, wireless protocols, communication signaling, or some other communication format—including combinations thereof.

User interface 902 comprises components that interact with a user. User interface 902 may include a keyboard, display screen, mouse, touch pad, or some other user input/output apparatus. User interface 902 may be omitted in some examples.

Processing system 903 may comprise a microprocessor and other circuitry that retrieves and executes software 905 from storage system 904. Storage system 904 may comprise a disk drive, flash drive, data storage circuitry, or some other memory apparatus. Software 905 comprises computer programs, firmware, or some other form of machine-readable processing instructions. Software 905 may include an operating system, utilities, drivers, network interfaces, applications, or some other type of software. When executed by processing system 903, software 905 directs processing system 903 to operate communication control system 900 as described herein.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of responding to a ranging request, comprising:
performing a plurality of ranging processes to monitor a status of a wireless link associated with a device identifier;
receiving a ranging request that includes the device identifier and a message skip indicator;
determining that the device identifier is already associated with the wireless link based on the device identifier and the message skip indicator;
determining a duration since a previously completed ranging process; and,
determining, based on whether the duration satisfies a criteria, and the message skip indicator, whether to respond to the ranging request.

2. The method of claim 1, wherein responding to the ranging request is based on the duration satisfying a criteria, wherein the duration satisfies the criteria when the duration exceeds a threshold.

3. The method of claim 1, wherein responding to the ranging request is based on the message skip indicator having a state associated with a partial network entry process.

4. The method of claim 1, wherein not responding to the ranging request is based on the message skip indicator having a state associated with a full network entry process.

5. The method of claim 1, wherein the device identifier comprises a medium access control (MAC) address.

6. The method of claim 5, wherein determining that the device identifier is already associated with the wireless link comprises determining that a MAC address associated with the ranging request is already registered on a network.

7. The method of claim 1, wherein the plurality of ranging processes comprises communication in accordance with a wireless communication protocol.

8. A method of responding to a ranging request, comprising:
receiving a ranging request that includes a device identifier associated with a wireless device that is already registered on a network;
determining that the wireless device is associated with an idle state;
determining whether the ranging request included a base station identifier and a paging controller identifier; and,
determining whether to respond to the ranging request based on whether the ranging request included the base station identifier and the paging controller identifier,
wherein the ranging request is not responded to if the ranging request did not include the paging controller identifier.

9. The method of claim 8, wherein the ranging request is not responded to if the ranging request did not include the base station identifier.

10. The method of claim 8, wherein the device identifier comprises a medium access control (MAC) address.

11. The method of claim 10, wherein the device identifier is determined to be associated with the wireless device that is already registered on a network by determining that a MAC address associated with the ranging request is already registered on the network.

12. The method of claim 8, wherein the ranging request comprises communication in accordance with a wireless communication protocol.

13. A communication system, comprising:
a communication network;
a network access system coupled to the communication network, the network access system configured to provide access to the communication network and configured to:
perform a plurality of ranging processes to monitor a status of a wireless link associated with a device identifier;
receive a ranging request that includes the device identifier and a message skip indicator;
determine that the device identifier is already registered with the communication network based on the device identifier and the message skip indicator;
determine a duration since a previously completed ranging process; and,
determine, based on whether the duration satisfies a criteria, and the message skip indicator, whether to respond to the ranging request.

14. The communication system of claim 13, wherein responding to the ranging request is based on the duration satisfying a criteria, wherein the duration satisfies the criteria when the duration exceeds a threshold.

15. The communication system of claim 13, wherein responding to the ranging request is based on the message skip indicator having a state associated with a partial network entry process.

16. The communication system of claim 13, wherein not responding to the ranging request is based on the message skip indicator having a state associated with a full network entry process.

17. The communication system of claim 13, wherein the device identifier comprises a medium access control (MAC) address.

18. The method of claim 17, wherein determining that the device identifier is already associated with the wireless link comprises determining that a MAC address associated with the ranging request is already registered on a network.

19. The communication system of claim 13, wherein the plurality of ranging processes comprises communication in accordance with a wireless communication protocol.

* * * * *